United States Patent
Büker et al.

(10) Patent No.: US 10,374,458 B2
(45) Date of Patent: Aug. 6, 2019

(54) INDUCTIVE POWER TRANSMISSION METHOD

(71) Applicant: WiTech GmbH, Bielefeld (DE)

(72) Inventors: Maik-Julian Büker, Paderborn (DE); Jörg Rainer Euskirchen, Bielefeld (DE); Marco Schmidt, Paderborn (DE)

(73) Assignee: Witech GmbH, Bielefeld (DE)

( * ) Notice: Subject to any disclaimer, the term of this patent is extended or adjusted under 35 U.S.C. 154(b) by 106 days.

(21) Appl. No.: 15/544,621

(22) PCT Filed: Jan. 19, 2016

(86) PCT No.: PCT/DE2016/000017
§ 371 (c)(1),
(2) Date: Aug. 18, 2017

(87) PCT Pub. No.: WO2016/116091
PCT Pub. Date: Jul. 28, 2016

(65) Prior Publication Data
US 2018/0013322 A1     Jan. 11, 2018

(30) Foreign Application Priority Data
Jan. 23, 2015 (DE) .................. 10 2015 000 665

(51) Int. Cl.
*H04B 5/00* (2006.01)
*H02J 50/10* (2016.01)
(Continued)

(52) U.S. Cl.
CPC ............. *H02J 50/10* (2016.02); *H02J 50/40* (2016.02); *H02J 50/80* (2016.02); *H04B 5/0037* (2013.01); *H04B 5/0075* (2013.01)

(58) Field of Classification Search
CPC ........ B60L 11/00; B60L 11/182; H01F 38/00; H01F 38/14; H02J 17/00; H02J 5/00;
(Continued)

(56) References Cited

U.S. PATENT DOCUMENTS

| 7,576,514 B2 | 8/2009 | Hui |
| 7,952,322 B2 | 5/2011 | Partovi |

(Continued)

FOREIGN PATENT DOCUMENTS

| DE | 102010047579 | 4/2012 |
| EP | 1 318 260 | 6/2003 |

(Continued)

*Primary Examiner* — Lincoln D Donovan
*Assistant Examiner* — Dave Mattison
(74) *Attorney, Agent, or Firm* — Cozen O'Connor

(57) ABSTRACT

A method of inductive power transmission by a transmitter and a receiver of an electrically operated device, the transmitter having at least one transmitter coil and the receiver having at least one receiver coil, a control for the power to be transmitted is provided in the transmitter, a minimum power is transmitted by the transmitter through the control at the start of a power transmission, the minimum transferring power is sufficiently dimensioned to activate a controller of the receiver of the electrically operated device. By influencing the field of the transmitter coil, the controller supplies data packets to the control that contain information about the electrically operated device so that an optimal power adapted to the power class of the device is transmitted by the transmitter.

10 Claims, 1 Drawing Sheet

(51) Int. Cl.
*H02J 50/40* (2016.01)
*H02J 50/80* (2016.01)

(58) Field of Classification Search
CPC .... H02J 5/005; H02J 7/00; H02J 7/025; H02J 50/00; H02J 50/10; H02J 50/40; H02J 50/80; H04B 5/00; H04B 5/0037; H04B 5/0075
USPC .......................................................... 307/104
See application file for complete search history.

(56) References Cited

U.S. PATENT DOCUMENTS

| | | | |
|---|---|---|---|
| 9,173,369 B1 | 11/2015 | Partovi | |
| 2007/0090790 A1* | 4/2007 | Hui | H01F 17/0006 320/108 |
| 2007/0182367 A1* | 8/2007 | Partovi | H01F 5/003 320/108 |
| 2017/0170686 A1* | 6/2017 | Van Wageningen | H02J 5/005 |

FOREIGN PATENT DOCUMENTS

| | | |
|---|---|---|
| WO | WO2007090168 | 8/2007 |
| WO | WO2012045303 | 4/2012 |
| WO | WO2012099965 | 7/2012 |

\* cited by examiner

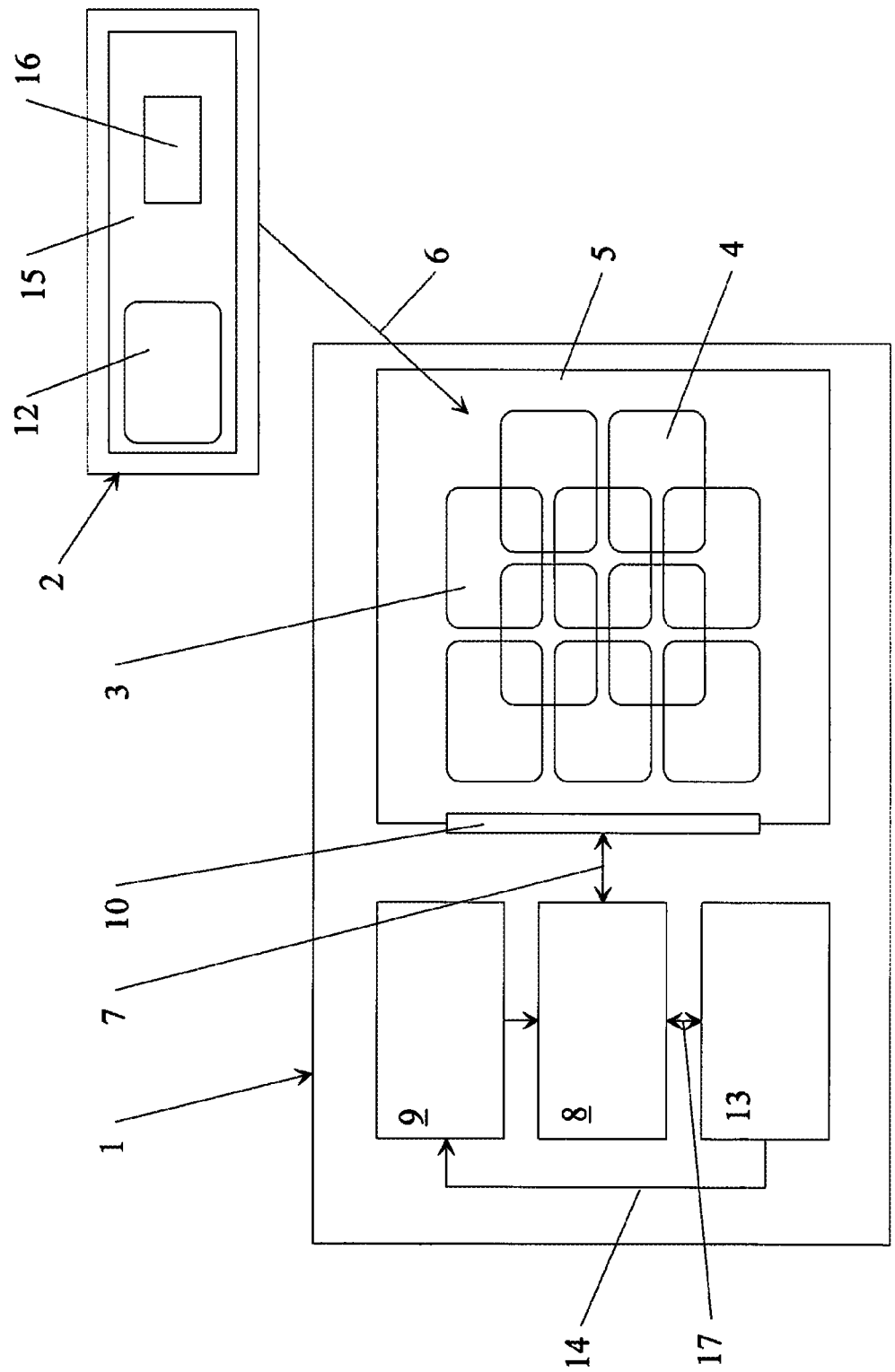

INDUCTIVE POWER TRANSMISSION METHOD

CROSS REFERENCE TO THE RELATED APPLICATIONS

This is a U.S. national stage of application No. PCT/DE2016/000017, filed on Jan. 19, 2016. Priority is claimed on German Application No. DE102015000665.7, filed Jan. 23, 2015, the content of which is incorporated here by reference.

BACKGROUND OF THE INVENTION

1. Field of the Invention

The invention is directed to a method of inductive power transmission by a transmitter and a receiver of an electrically operated device such as a laptop, a smartphone, a tablet or the like, the transmitter having at least one transmitter coil and the receiver having at least one receiver coil.

2. Description of the Prior Art

There are various known inductive power transmission systems and methods for charging batteries to power electric devices, for example. EP 1 318 260 A2, which discloses wireless power transmission from a fixed network to a battery moved with a door leaf.

A further intended use is disclosed by DE 10 2010 047 579 A1. Disclosed therein is a two-dimensionally extending furniture part, for example, a tabletop or worktop, in which a plurality of transmitter coils for inductive power transmission are integrated for an electrically operated device such as, in particular, a laptop, a smartphone, a tablet or the like. The aim here is for an electrical consumer that is set down in any way on a furniture part to undergo a power transfer.

These consumers, for example, laptops, smartphones, tablets or the like, are sorted into different power classes of power consumption.

SUMMARY OF THE INVENTION

It is an object of one aspect of the present invention to allow devices of the type mentioned above to get an optimal power supply and, beyond this, particularly when there are a plurality of transmitter coils arranged in a furniture part which preferably extends two-dimensionally, to select transmitter coils or a group of transmitter coils suitable for an optimal power supply. A further aim is to comply with existing guidelines for the limiting values of the power transmitted by the transmitter coils.

First, in a method of inductive power transmission, a control for the power to be transmitted is provided in a transmitter, a minimum power is transmitted by the transmitter through the control at the start of a power transmission, the minimum transferring power is sufficiently dimensioned to activate a controller of the receiver of the electrically operated device, whereupon by influencing the field of the transmitter coil, the controller supplies data packets to the control that contain information about the electrically operated device, whereupon an optimal power adapted to the power class of the device is transmitted by the transmitter.

A first advantage of the method according to the invention is that a control is provided for the transferring power. This type of power control can be carried out continuously, but also discretely. The control is carried out between a minimum power and a maximum power. The minimum power is dimensioned in such a way that it is sufficient for small devices but, on the other hand, the limiting values for an inductive power transmission of a transmitter coil are complied with. In the present invention, a typical minimum value for the transmitting power is 5 watts.

However, this minimum power is also sufficient to activate a controller of the receiver of the electrically operated device. This controller interacts with the transmitter. Information is supplied to the control digitally in data packets by influencing the field of the transmitter coils. In this way, for example, the transmitter learns the power class of the electrically operated device so that an optimal power, which is adapted to this power class of the device, is transmitted by the transmitter coil.

In particular, the idea is that information allows the control to identify the device and to rank the device in a power class, that a power adapted to the power class is transmitted by the transmitter, and that a fine adjustment of the power is carried out in the device.

The identification ensures that communication and power transmission can take place between the transmitter and receiver in accordance with the inventive method. Further, intermediate values can be necessary for an optimal supply, for example, in discrete power classes. Intermediate values of this kind are then not adjusted by a direct control of the transmitter output as is customary, but rather a fine adjustment of this type is carried out inside the device.

However, if an overvoltage event comes about, but also in other cases, the transmitted power is reduced by a power class. Of course, besides this, all other known protective measures can be taken.

The method according to one aspect of the invention is also suitable when a plurality of transmitter coils are provided. A plurality of transmitter coils are generally arranged in arrays in accordance with U.S. Pat. No. 7,576,514 B2, for example.

It will be understood that the transmitter coil and receiver coil should be directly opposite one another for an optimal transmission of energy. To the greatest possible extent, according to one aspect of the invention, as a result of the control, the transmitter coils transmit the minimum power consecutively and that the control switches the transmitter coil for the optimum power transmission in which the coupling with the receiver coil and/or in which the influencing of its electrical field are/is greatest. This can be detected, for example, by monitoring the no-load voltage of the transmitter coils, after which an optimal energy transmission can be carried out.

Further, U.S. Pat. No. 7,576,514 B2 discloses that transmitter coil arrangements can also be arranged in more than one plane and, in this case, in an overlapping manner.

Therefore, it is advisably provided according to one aspect of the invention that the transmitter coils of a first plane transmit the minimum power consecutively through the control, that the overlapping transmitter coils of the next plane transmit the minimum power consecutively through the control, and that the control switches the transmitter coil for the optimal power transmission in which the coupling with the receiver coil and/or in which the influencing of its electric field are/is greatest.

If larger electrically operated devices are to be provided with power, a group of coils, particularly adjacent or overlapping coils, can be switched through the control in addition to an individual coil.

The position of a laptop, tablet, or a similar electrically operated device placed on a worktop, a conference table or the like is not permanent. Relocating a device of this kind is unproblematic if it is further provided that the optimal power transmission of the switched transmitter coil is interrupted at predeterminable time intervals and that the minimum power is applied consecutively to the transmitter coils adjacent to the previously switched transmitter coil and/or to the transmitter coils overlapping the previously switched transmitter coil through the control, and that the control switches the transmitter coil for the optimal power transmission in which the coupling with the receiver coil and/or in which the influencing of its electrical field are/is greatest.

It is precisely when using the method according to the invention with conference tables, worktops or the like at which persons remain for extended periods of time that limiting values of the inductive power transmission should be adhered to. This is comparatively unproblematic when the higher-power devices to be supplied have a sufficiently large footprint or a sufficiently large base area of the receiver coil in order to reliably cover a transmitter coil or at least a large portion thereof. Supplying power to electrically operated devices having a comparatively small base area which is smaller than the diameter of a transmitter coil is problematic.

Therefore, it is provided that the data packets contain the base area information of the device, whereupon a power adapted to the base area of the electrically operated device is transmitted by the transmitter.

This ensures that the predetermined limiting values of the inductive power transmission are adhered to.

Alternatively or in addition, it can be provided that with devices having a receiver coil with a base area having smaller dimensions than those of the transmitter coil, the base area of the electrically operated device is increased by shielding material beyond the extent of the transmitter coil. Ferrite, for example, can serve in particular as shielding material.

A demodulation of the influencing of the field of the transmitter coil is required for transmitting and evaluating the data packets, and the influencing is preferably a capacitive modulation.

A demodulator required for this purpose is generally not immediately settled for data transmission. In view of this, it may be advisable for the data transmission to be preceded by at least one training sequence. A reliable settling of the demodulator is ensured as a result of this step.

A training sequence of this kind includes, for example, transmitting the numeral 1 or a combination of numbers. The quantity of packets transmitted with the training sequence is preferably between one and ten packets.

BRIEF DESCRIPTION OF THE DRAWINGS

The invention will be described more fully with reference to the drawing in which devices for carrying out the method are shown only schematically.

The sole FIGURE shows a transmitter 1 and an electrically operated device 2.

DETAILED DESCRIPTION OF THE PRESENTLY PREFERRED EMBODIMENTS

As shown in the FIGURE, the transmitter 1 has a plurality of transmitter coils 3, 4, shown only schematically, which are arranged in two planes in an overlapping manner, for example, on the upper side and underside of a circuit board 5. A coil arrangement of this kind is ideally suited for integration in a worktop, in a tabletop of a conference table, or the like, for supplying power to electrically operated devices 2 placed thereon as indicated by arrow 6.

The control of the individual transmitter coils 3, 4, possibly also a controlling of transmitter coils 3, 4 in groups, is carried out as indicated by double arrow 7, toward the right in the FIGURE, by a matrix control 8 switched by a microcontroller. This matrix control 8 distributes the transmission power provided by a power stage 9, according to distributor 10, to an individual transmitter coil 3 or 4 or to a group of transmitter coils 3, 4 via a further interconnection, not shown.

For the inductive power transmission, the electrically operated device 2 has a corresponding receiver coil 12. When the device 2 is placed above the transmitter coils 3, 4 according to arrow 6 for an inductive power transmission, the power stage 9 is set to a minimum power output by a control 13 controlled by a microcontroller according to arrow 14.

In principle, the transmitter coils 3, 4 are then consecutively connected to the minimum power in each instance. This minimum power output is sufficient for activating, via the receiver coil 12 of the device 2 with associated receiver 15, a controller 16 through which the field of the transmitter coils 3, 4 is influenced.

As a consequence of the influencing, a transmission of information about the electrically operated device 2 takes place according to double arrow 7, toward the left in FIG. 1, to the control 13 via the matrix control 8 according to double arrow 17. In this way, the transmitter 1 can identify the device 2 and, in particular, also transmit an optimal power adapted to the power class of the device 2.

For example, if intermediate values should be necessary for an optimal supply, a fine adjustment of this kind takes place within the device 2. In case of an overvoltage event, the transmitted power is reduced by a power class.

For an optimal power transmission, the transmitter coil 3, 4 with the largest coupling to the receiver coil 9 is used by the control 13 according to double arrow 17 via the matrix control 8.

Since a plurality of transmitter coils 3, 4 is provided in two planes in the embodiment example, the control 13 will apply the minimum power supplied by power stage 9 first, for example, to the transmitter coils 3 of a first plane consecutively via the matrix control 8. It is then determined by the control 13 which of the coils 3 has undergone a maximum change of field. Thereupon, it will preferably again apply, via the matrix control 8, the minimum power only to the transmitter coils 4 of the next plane that overlap with the transmitter coil 3 of the first plane, and the coil 3, 4 of the two planes in which the change in the electrical field is the greatest is then chosen.

An approach of this type can also be adapted to groups of transmitter coils if the receiver coil 12 has a corresponding two-dimensional extension.

However, the base area of the receiver coil 12 is often comparatively small, often smaller than that of a transmitter coil 3, 4. The transmitted data packets will then contain information about the base area of the device 2, whereupon the power stage 9 is switched by the control 13 to the minimum power output which is then switched by the matrix control 8 to the relevant transmitter coil 3, 4. A maximum permissible inductive power transmission can be ensured in this way.

A demodulation of the change in field of a transmitter coil 3, 4 is required for reading out the information about, or status of, an electrically operated device 2. To ensure complete demodulation of a data packet with respect to time, it can further be provided that the transmission of the data packet is preceded by the transmission of a training sequence.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method of inductive power transmission by a transmitter to a receiver of an electrically operated device, the transmitter having a control for power to be transmitted and at least one transmitter coil and the receiver having at least one receiver coil, the method comprising:
   transmitting a minimum power by the transmitter at a start of a power transmission, wherein the minimum power is configured to activate a controller of the receiver of the electrically operated device;
   receiving by the control, from the controller of the receiver, data packets that contain information about the electrically operated device by influencing a field of the transmitter coil;
   transmitting a power adapted to a power class of the electrically operated device by the transmitter based at least in part on the data packets
   wherein a plurality of a transmitter coils are provided, and
   wherein the transmitter coils transmit the minimum power consecutively through the control, and
   switching by control switches the plurality of transmitter coils for an optimum power transmission in which at least one of a coupling with the receiver coil and an influencing of its electrical field is greatest,
   interrupting the optimal power transmission of the switched transmitter coil at predeterminable time interval and the minimum power is applied to at least one of the transmitter coils adjacent to the previously switched transmitter coil and the transmitter coils overlapping the previously switched transmitter coil; and
   switching, by the control, the transmitter coil for the optimal power transmission in which at least one of the coupling with the receiver coil and the influencing of its electrical field is greatest.

2. The method according to claim 1, wherein the information allows the control to:
   identify the electrically operated device; and
   rank the electrically operated device in a power class,
   wherein the power adapted to the power class is transmitted by the transmitter, and a fine adjustment of the power is carried out in the electrically operated device.

3. The method according to claim 1, wherein the transmitted power is reduced by a power class when an overvoltage occurs.

4. Method according to claim 1,
   wherein the coils are arranged in more than one plane so as to overlap,
   wherein the transmitter coils of a first plane transmit the minimum power consecutively through the control and the overlapping transmitter coils of the next plane transmit the minimum power consecutively through the control; and
   wherein the control switches the transmitter coil for the optimal power transmission in which at least one of the coupling with the receiver coil and the influencing of its electric field is greatest.

5. The method according to claim 1, wherein a group of transmitter coils is switched.

6. The method according to claim 1, wherein the data packets contain base area information of the electrically operated device, whereupon a power adapted to the base area of the electrically operated device is transmitted by the transmitter.

7. The method according to claim 1, further comprising:
   increasing a base area of the electrically operated device by shielding material beyond an extent of the transmitter coil when the electrically operated device have a receiver coil with a base area having smaller dimensions than those of the transmitter coil.

8. The method according to claim 1, wherein a transmission of at least one training sequence precedes a data packet.

9. The method according to claim 1, wherein the electrically operated device is one of a laptop, a smartphone, and a tablet.

10. The method according to claim 1, further comprising supplying, by the controller of the receiver of the electrically operated device, the data packets that contain the information about the electrically operated device.

* * * * *